United States Patent [19]
Karlock

[11] Patent Number: 5,311,298
[45] Date of Patent: May 10, 1994

[54] CHROMA ADJUSTMENT CIRCUIT

[76] Inventor: James A. Karlock, 3311 NE. 35th Ave., Portland, Oreg. 97212

[21] Appl. No.: 822,038

[22] Filed: Jan. 15, 1992

[51] Int. Cl.[5] ............................................. H04N 9/68
[52] U.S. Cl. .................................... 348/710; 307/242; 307/262; 348/713; 348/645
[58] Field of Search .................... 358/35, 28, 27, 40; 307/242, 262; H04N 9/68

[56] References Cited

U.S. PATENT DOCUMENTS

| | | | |
|---|---|---|---|
| 2,700,698 | 1/1955 | Hammond | 350/35 |
| 3,514,533 | 5/1970 | de Weger | 178/7.1 |
| 3,520,991 | 7/1970 | Rhee et al. | 178/5.4 |
| 3,649,851 | 3/1972 | Cohen | 307/262 |
| 4,174,522 | 11/1979 | Taguchi | 358/35 |
| 4,346,315 | 8/1982 | Roberts | 307/242 |
| 4,620,220 | 10/1986 | Naimpally et al. | 358/40 |
| 4,970,583 | 11/1990 | Karlock | 358/27 |
| 5,161,005 | 11/1992 | Harradine | 358/28 |

FOREIGN PATENT DOCUMENTS

| | | | |
|---|---|---|---|
| 2649849 | 1/1991 | France | H04W 9/68 |
| 0007234 | 1/1979 | Japan | 358/28 |

Primary Examiner—Mark R. Powell
Assistant Examiner—Jeffrey S. Murrell
Attorney, Agent, or Firm—Dellett and Walters

[57] ABSTRACT

Simplified apparatus for controlling the phase and amplitude of the chroma subcarrier of a television signal is disclosed. The phase control includes compensation so that the color burst amplitude is stable as the phase is varied.

16 Claims, 2 Drawing Sheets

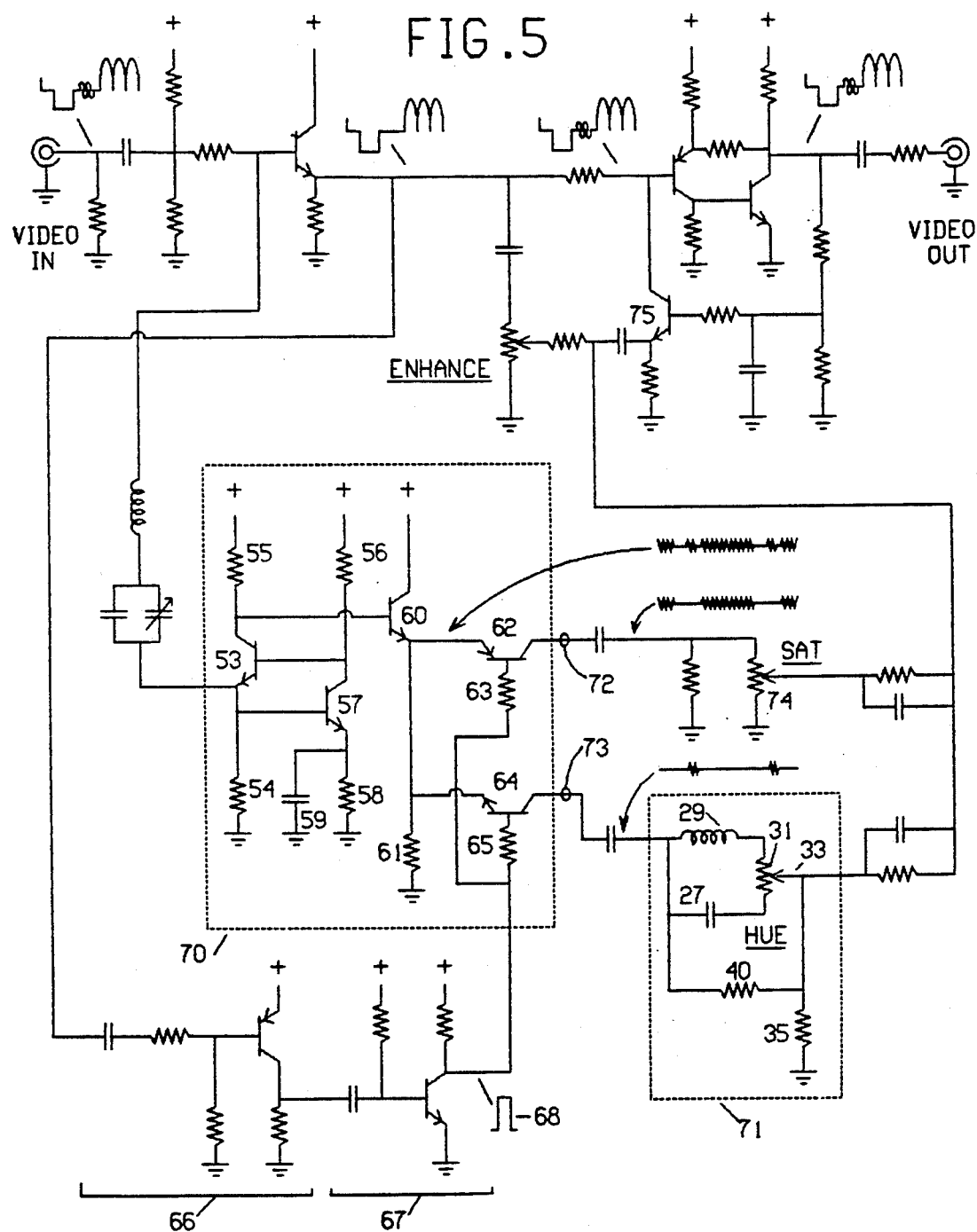

CHROMA ADJUSTMENT CIRCUIT

BACKGROUND OF THE INVENTION

This invention relates to certain improvements to circuitry for adjusting the chroma level and burst phase of the chroma subcarrier component of a color television signal.

While my previous U.S. Pat. No. 4,970,583 disclosed a satisfactory method and apparatus for such adjustments, the circuitry was more complex than desired.

U.S. Pat. No. 3,520,991, issued to Dong W. Rhee on Jul. 21, 1970, disclosed a simple method of adjusting the phase and amplitude of the chroma portion of a video signal. His method, while entirely satisfactory for use in a television receiver, has the disadvantage that the amplitude of the phase shifted chroma signal varies with the amount of phase shift.

SUMMARY OF THE INVENTION

The object of the present invention is to provide more economic adjustment of chroma amplitude and burst phase.

This is accomplished by modifying the Rhee circuit so as to reduce the amplitude variations to an acceptable level for use in a video processor while changing the chroma switch driving the modified Rhee circuit to a more economical configuration.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIG. 5 shows the improved phase shifter and an improved chroma switch incorporated into a complete device.

DESCRIPTION OF THE PRIOR ART

Figure 1:
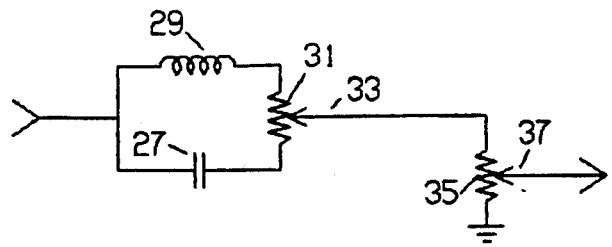
FIG. 1 shows Rhee's original circuit.
Figure 2:
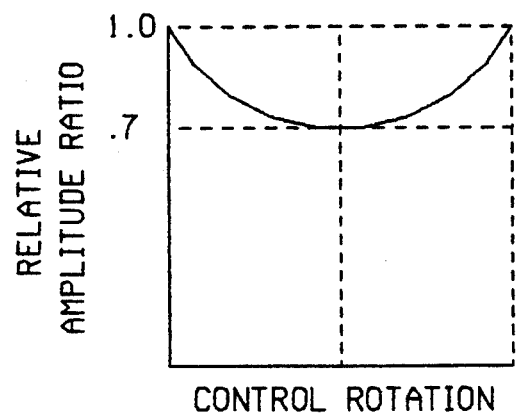
FIG. 2 shows the original output amplitude variation with the phase adjustment.

FIG. 1 shows that Rhee's original circuit provided potentiometer 31 to control phase shift, essentially by means of selecting either an inductor or capacitor to put in series with the output load resistor 35 which also serves as an amplitude control. Such an arrangement combines the opposite phase shifts of the inductor and capacitor in varying amounts so as to provide a smooth variation in phase shift as the variable arm 33 is moved from one extreme to the other. The center of rotation corresponds to zero phase shift. Unfortunately, the amplitude varies from unity to 70 percent at the center of its range as shown in FIG. 2.

DETAILED DESCRIPTION OF THE PRESENT INVENTION

Figure 3:
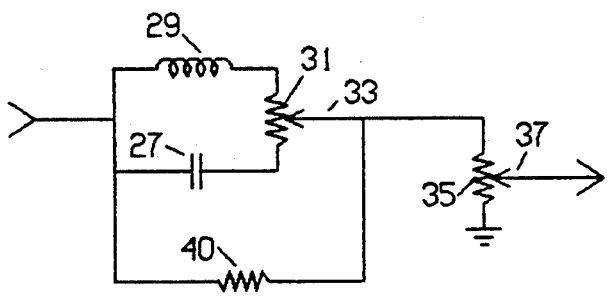
FIG. 3 shows the preferred embodiment of the improved phase shifter.
Figure 4:
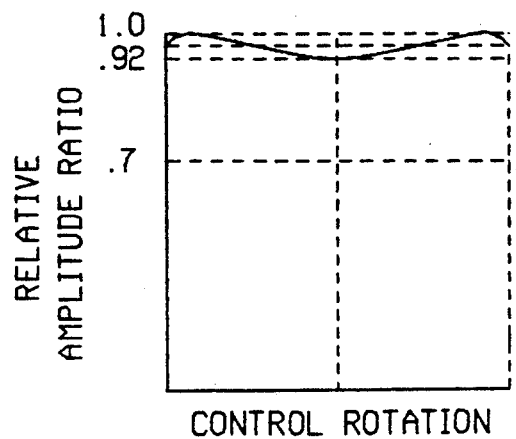
FIG. 4 shows the output amplitude variation with phase adjustment for the improved circuit.

The improved circuit shown in FIG. 3 adds an amplitude compensation resistor 40 between the input and the variable arm 33 of the phase control 31 so as to raise the amplitude when the phase control is centered. FIG. 4 shows that this added resistor essentially pushes the drooped center portion of the original FIG. 2 curve upwards while having little effect at the two extremes of the curve. This added resistor has the most effect on the output amplitude when phase control 31 is set at its midpoint since this is the point at which this potentiometer exhibits its maximum source resistance. When variable arm 33 is at the end points of potentiometer 31, the added resistor is essentially shunting either the capacitor or inductor and thus has a lesser influence on the output amplitude.

Various choices of component values can produce various amplitude vs. control rotation curves. For instance, if resistor 40 is made quite small, then the center point of the curve shown in FIG. 4 can be raised above the end points, but with less total phase range. If resistor 40 is made larger, the center point of the curve droops more like the original curve of FIG. 2. An overall amplitude stability within 10 percent is easily achievable compared to 30 percent in the prior art design.

FIG. 5 shows how this new circuit can be incorporated into a circuit much like that disclosed in my previous U.S. Pat. No. 4,970,583, the disclosure of which is hereby incorporated by reference herein. Chroma switch 70 splits the chroma into two components, one containing the chroma without burst at 72 and the second containing only the color burst at 73. This is accomplished by first amplifying the chroma signal in a three transistor amplifier made up of common base connected transistor 53 and emitter follower 60 which provides a low impedance output to drive the switches 62 and 64. Transistor 57 is connected so as to lower the input impedance at the common base transistor 53. Sync separator 66, of conventional design, supplies separated sync to half-shot multivibrator 67 which provides a positive burst pulse 68 corresponding to the color burst time. Transistor 62 is a PNP type while transistor 64 is an NPN; thus they alternately conduct when driven by the same control signal, i.e., burst pulse 68 through isolation resistors 63 and 65. The result is an output at point 72 containing chroma without burst and an output at point 73 containing only color burst.

Potentiometer 74 allows setting of the chroma signal amplitude exclusive of the color burst, while the above described phase shift circuit 71 allows setting of burst phase without affecting other parts of the video signal. The two components of the chroma signal are combined in current summing transistor 75 in a manner like that of my previous design disclosed in U.S. Pat. No. 4,970,583. Resistor 35 is not made variable in this configuration because, at its position in this circuit, it would adjust only burst amplitude and such an adjustment was not desired in this particular circuit.

It will be appreciated that the invention is not restricted to the particular embodiment that has been described, and that variations may be made therein without departing from the scope of the invention as defined in the appended claims and equivalents thereof.

I claim:

1. An apparatus for shifting the phase of an input signal received at an input terminal, said apparatus, comprising:

a variable combining means having first and second inputs and an output;

a phase lag means coupled between said input terminal and said first input of said variable combining means;

a phase lead means coupled between said input terminal and said second input of said variable combining means;

amplitude compensation means coupled to said input terminal and having an output for providing a portion of said input signal; and a two-input summing means having a first input connected to the output of said combining means and a second input connected to the output of said amplitude compensation means and providing an amplitude corrected output;

so as to allow an adjustable phase shift with minimized amplitude variation as the variable combining means is varied.

2. An apparatus as in claim 1, wherein the input signal is the chroma component of a video signal.

3. An apparatus as in claim 1, wherein said signal is the color burst component of the chroma component of a video signal.

4. An apparatus as in claim 1 further comprising a switch for receiving the chroma component of a video signal and separating the color burst component from the chroma component and applying the color burst component to said input terminal.

5. An apparatus as in claim 1, wherein said variable combining means is a potentiometer having a variable arm that constitutes the output of the variable combining means.

6. An apparatus as in claim 1, wherein said phase lead means is a capacitor.

7. An apparatus as in claim 1, wherein said phase lag means is an inductor.

8. An apparatus as in claim 1, wherein said variable combining means is a potentiometer having a variable arm that constitutes the output of the variable combining means, said phase lead means is a capacitor, said phase lag means is an inductor, and said amplitude compensation means is a resistor.

9. An apparatus for alternatively directing a chroma signal including a color burst from an input to one of two outputs in response to a control signal, applied to a control terminal, comprising:

an NPN transistor with its current carrying terminals connected between said input and a second of said two outputs;

a PNP transistor with its current carrying terminals connected between said input and a first of said two outputs;

a resistor connected between said control terminal and the base of said NPN transistor; and a second resistor connected between said control terminal and the base of said PNP transistor, so as to cause said transistors to alternately conduct, splitting said signal into two time divided outputs containing said chroma without said color burst at said first output and said color burst at said second output.

10. An apparatus for processing the chroma and color burst portions of a video signal, comprising:

an input terminal connected to receive said chroma portion of said video signal;

a first transistor with its current carrying terminals connected between said input terminal and an amplitude setting potentiometer;

a second transistor with its current carrying terminals connected between said input terminal and a phase shifting network which includes an amplitude compensation resistor;

a source of a control signal, for application to the control terminals of said first and said second transistors that causes said first transistor and said second transistor to alternately conduct;

a combining means to combine the outputs of said potentiometer and said phase shift network, so as to allow control of the phase of said color burst with less unwanted amplitude variation of said burst and control of the amplitude of the chroma subcarrier.

11. An apparatus as in claim 10, wherein the phase shifting network comprises an inductor having one terminal connected to said second transistor, a capacitor having one terminal connected to said second transistor, a variable mixing means having a first input terminal connected to a second terminal of the inductor, a second input terminal connected to a second terminal of the capacitor, and an output terminal connected to the combining means, and said amplitude compensation resistor connected between said second transistor and the output terminal of the variable mixing means.

12. An apparatus for shifting the phase of a signal received at an input terminal, comprising:

a potentiometer with a variable arm;

an inductor connected between a source of said signal and one end of said potentiometer;

a capacitor connected between said source of signal and the other end of said potentiometer;

a load resistor connected to the variable arm of said potentiometer; and a second resistor connected between said source of signal and said variable arm, so as to preserve the amplitude of the outputted signal at said variable arm when the potentiometer is set such that the signal at the adjustable arm is substantially in phase with the input signal.

13. An apparatus as in claim 12, wherein the signal is a chroma subcarrier of a video signal.

14. An apparatus as in claim 12, wherein said signal is the color burst component of the chroma subcarrier of a video signal.

15. An apparatus as in claim 12, further comprising a switch at the input terminal of said apparatus.

16. An apparatus as in claim 15, wherein said switch supplies a chroma burst component of a chroma subcarrier.

* * * * *